United States Patent
Taylor

(10) Patent No.: US 6,439,508 B1
(45) Date of Patent: Aug. 27, 2002

(54) INFLATABLE HABITATION VOLUMES IN SPACE

(75) Inventor: Thomas C. Taylor, 201 E. Las Cruces Ave., Las Cruces, NM (US) 88011

(73) Assignee: Thomas C. Taylor, Las Cruces, NM (US)

(*) Notice: Subject to any disclaimer, the term of this patent is extended or adjusted under 35 U.S.C. 154(b) by 0 days.

(21) Appl. No.: 09/686,145

(22) Filed: Oct. 10, 2000

Related U.S. Application Data

(60) Provisional application No. 60/160,497, filed on Oct. 20, 1999, and provisional application No. 60/160,499, filed on Oct. 20, 1999.

(51) Int. Cl.$^7$ .................................................. B64G 1/10
(52) U.S. Cl. ........................................................ 244/159
(58) Field of Search ............................. 244/158 R, 159, 244/161, 162, 163, 125, 160; 52/2.11

(56) References Cited

U.S. PATENT DOCUMENTS

| | | | |
|---|---|---|---|
| 3,144,219 A | * | 8/1964 | Schnitzer ..................... 114/116 |
| 3,169,725 A | * | 2/1965 | Berglund ................. 244/155 R |
| 3,210,026 A | * | 10/1965 | Frisch ......................... 244/159 |
| 3,332,640 A | * | 7/1967 | Nesheim ..................... 244/159 |
| 3,401,903 A | | 9/1968 | Bohr |
| 3,952,976 A | | 4/1976 | Fletcher |
| 3,991,583 A | * | 11/1976 | Scurlock ..................... 405/193 |
| 4,132,373 A | | 1/1979 | Lang |
| 4,562,979 A | | 1/1986 | Taylor |
| 4,807,833 A | | 2/1989 | Pori |
| 4,825,599 A | * | 5/1989 | Swann, Jr. ................... 244/159 |
| 4,867,395 A | | 9/1989 | Taylor |
| 5,044,579 A | * | 9/1991 | Bernasconi et al. .... 244/158 R |
| 5,058,330 A | * | 10/1991 | Chow ......................... 52/169.1 |
| 5,217,187 A | | 6/1993 | Criswell |
| 5,305,970 A | | 4/1994 | Porter |
| 5,350,138 A | | 9/1994 | Culbertson |
| 5,580,013 A | * | 12/1996 | Velke ......................... 135/123 |
| 5,813,632 A | * | 9/1998 | Taylor ..................... 244/158 R |
| 6,231,010 B1 | * | 5/2001 | Schneider et al. .......... 244/159 |

OTHER PUBLICATIONS

NASA, Artwork Tranhab, 1999 with 4 Levels.
Seattle Post–Intell, Fri. Oct. 29, 1999, Press Article "Boeing has Big Dreams . . ." 4 p.
Seattle Post–InTell, Thurs. Sep. 23, 1999 Press 1p.
Habitation Module Commercialization Conference NASA, Aug. 24–26, 1999, See Website p. 4–6, 10p.
TransHab—NASAFactSheet No Date Aug. 1999, 4 p.
Provisional Patent Appl No. 60/160,497 filed Oct. 20, 1999 38p.
Provisional Patent Appl. No. 60/160,499 Filed Oct. 20, 1999, 29p.
TransHab Module Opporunity T. Taylor, Oct. 15, 1999 10p.
Partial Gravity Habitat for Space Tourism T.C. Taylor, May 1999 14p.

* cited by examiner

Primary Examiner—Charles T. Jordan
Assistant Examiner—Kevin Jakel

(57) ABSTRACT

An improved inflatable habitation volume in space comprising reduced cost, improved debris impact protection, enhanced penetration resistance, self sealing qualities, innovative flat end caps, industry accepted commercial design/manufacturing techniques, enhanced inflatable assembly techniques and expanded interior volume. Costs are reduced by compressing the launch package, removing the three gravity launch load requirements from the transportation process and inflating in microgravity. The inflatable habitation volume unit can be connected to either existing orbital facilities or connected to similar units to create expanded volumes and space tourist torus structures rotated for partial gravity.

20 Claims, 9 Drawing Sheets

INFLATABLE HABITATION VOLUMES IN SPACE

CROSS-REFERENCE TO RELATED APPLICATIONS

This utility patent application claims the benefit of the filing of U.S. Provisional Patent Application Ser. No. 60/160,497, entitled Inflatable Habitation Volumes in Space, filed on Oct. 20, 1999 and the specification thereof is incorporated herein by reference.

This utility patent application also claims the benefit of the filing of U.S. Provisional Patent Application Ser. No. 60/160,499, entitled Inflatable Space Tourism Volume, filed on Oct. 20, 1999 and the specification thereof is incorporated herein by reference.

NO GOVERNMENT RIGHTS

No government finding, no government support or government contract or clause is related to this concept.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention (Technical Field)

The present invention relates generally to a pressurized volume in space, transported in the deflated condition and inflated in the vacuum and microgravity of orbit for use as habitation or other volumes like space stations.

2. Background Art

Space tourism is expected to be a future industry in space, but many believe two orders of magnitude in cost reduction must be achieved before this new industry emerges. A traditional habitation module in the range of $425m is transported in the space shuttle for approximately $500m. The typical metal module weighs approximately 38,000 pounds and provides approximately 4,600 cubic feet of pressurized interior volume. This means the current state of the art habitation module costs approximately $24,000 per pound or approximately $201,000 per cubic foot of internal volume. Habitation in space is important to this emerging space tourism industry. The current reusable launch vehicle transportation is in the range of approximately $4,000 per pound, so additional innovation is required in both transportation and module design to reach the space tourist cost goal. Getting the cost reduced is important to the emergence of this new industry. Two orders of magnitude in cost reductions are difficult to achieve.

If an innovative, inflatable habitation volume in the range of $50m is transported in a reusable vehicle for approximately $20m, then a near term space tourist market may emerge. The module weighs approximately 5,000 pounds and provides approximately 21,000 cubic feet of useful pressurized interior volume. Assume a second trip of a reusable vehicle for approximately $20m is required to infill the volume with additional ECLS equipment worth $30m for a total $80m in orbital habitation hardware costing $40m to transport. This means the inflatable state of the art goal for a habitation module could be in the range of costs like $15,000 per pound or $7,142 per cubic foot of internal volume. This assumption is still too expensive to satisfy the two orders of magnitude in cost reduction.

Assume the space tourism industry matures and the space transportation, in hardware and operations, brings costs to a point closer to the airline tourist industry, then what assumptions are anticipated in cost? If maturity in reusable transportation and inflatable technology is achieved in cost, then a second-generation inflatable habitation volume in the range of $25m is transported in the reusable launch vehicle for approximately $10m. The module weighs approximately 8,000 pounds and provides approximately 21,000 cubic feet of pressurized interior volume. This means the inflatable state of the art goal for a habitation module is in the range of $4,375 per pound or $1,667 per cubic foot of internal volume. This is still above two orders of magnitude of the goal of $240 per pound, but just below the $2,010 per cubic foot goal for space tourist industry stimulation and emergence.

The advantage of the present invention is an operational habitation module that works together in an integrated cost effective manner to contain the interior pressurized volume, provide Environmental Controlled Life Support Systems (ECLSS) required for humans, protect the integrity of the pressure envelope, transfer cargo, maintain the pressure and other gases at proper pressure including timely repair, and expansion as required. The inflated pressurized volume provides near earth pressure, protection from temperature extremes, particle impact and other hazards in microgravity.

The present invention relates to inflatable structures in space, specifically to a new design for an inflatable habitation volume, to an improvement or modification of the fabrication/design of an early NASA inflatable design and to the future utilization of both the new concept and the enhanced NASA inflatable TransHab Module design. The transportation costs are reduced, because the inflatable is transported to orbit before it is inflated and can be further enhanced by future launches.

Metal habitation modules are currently used for space stations, because these high strength alloys are needed to withstand the three gravity launch loads, the pressure loads from the 14.7 psia interior habitation pressure in orbit, the high speed particle impact and puncture loads in orbit and other loads resulting from the temperature extremes and misc loads. These loads vary greatly with location, transportation and duration and result in significant metal weight. The design loads from transportation are relatively short in duration, but generally drive the design, because they are in the range of three times gravity. The interior pressure load is significantly different from the launch loads and drive the metal design toward becoming a sphere in shape, while the typical transportation volume is a cylinder. The particle impact loads force the design into a series of mass barriers used to break up the particle before it strikes the pressure shell. The key to an impact barrier is the proper spacing of each impact barrier from the pressure bladder or other barriers and requires a specific distance to become effective, which reduces the interior volume of a metal module solution. This design weight required to resist these separate loads must be transported to orbit on expensive transportation systems in the range of $10,000 per pound.

The background art explores various ways of obtaining more interior volume with less transportation cost by composite forms, clever packing methods, folding struts, furlable metal segments, air supported earth based structures, inflatable nose missile cones, flat end caps, telescoping walls and salvaging existing hardware in orbit.

U.S. Pat. No. 4,730,797, to Minovitch, et. al., entitled "INFLATABLE CORE ORBITAL CONSTRUCTION METHOD AND SPACE STATION" is a construction form inflated in orbit and used to hold wraps of other materials to form large space volumes. Although suggested as automatic, outside (extra vehicular activity, EVA) labor in orbit for the portions of this device that can not be automatic must be performed in a microgravity vacuum, which is very expensive. Without gravity, typical construction techniques in one gravity do not work in microgravity and vacuum. There is no mention of solutions for launch loads and pressure used for habitation in orbit, plus the high-speed particle impact protection that works in orbit. There is no phased build up to soften the initial financial impact of the project.

U.S. Pat. No. 4,744,533, to Mullen, et. al., entitled "MODULAR SPACE STATION," is altering the building materials into hollow module "U" shaped segments designed to fit within the space shuttle's payload bay and assembled in orbit. The resulting square hut shaped space station with a square structural shape is not consistent with a minimum material/weight structure similar to a sphere, which drives pressure volume designs in a vacuum. The structure requires many joints to be made in space and appears to require many outside labor intensive joints. The details of the joints are not given, but the joints are in tension and worse result in a ripping load configuration. The outside labor in orbit for the joint portions must be performed in a microgravity vacuum and is very expensive, because no joints can be made from the inside, until the entire structure is pressurized, which requires all joints to be completed. Without gravity, typical labor intensive construction techniques in one gravity do not transfer well in to microgravity and vacuum. This design is overly focused on accommodating the transportation envelope and lacks much construction consideration of the problems and remote conditions in orbit. While the '533 Patent solutions for launch loads and volume are used, little else is considered in the design life of the structure. The classic approach of altering the building materials to fit the transportation device is the wrong direction to proceed for cost reduction.

U.S. Pat. No. 5,184,789, to Aldrin, entitled "SPACE STATION FACILITY," is a standard space station with metal pressurized modules and lots of struts. The modules are standard and the struts fold in the center to fit within the 60' long space shuttle. This means the struts are ~120' long and the modules larger than any known launch vehicle could carry. It is not clear what value the struts provide; do they make the modules lighter and how do they address the primary commercial issues of transportation weight and cost?

U.S. Pat. No. 5,451,975, to Miller and Nyden, entitled "FURLABLE SOLID SURFACE REFLECTOR," is a metal expanding structure with interlocking metal panels expanded to create a reflector. It is not meant to be a pressure volume, but the metal interlocking with metal might provide a pressure seal, but would be difficult to repair, if a high speed particle impact were to occur. While this solution may address launch loads in the compressed configuration and provide a reduced volume, however little else applies to the design life of a habitation volume structure in orbit. It does not appear the expandable metal to metal joint could be pressurized.

U.S. Pat. No. 03,836,417, to Yaeger, et. al., entitled "LAMINATE FOR HUMAN HABITATION" is earth based air supportable structures with rigidized beams on the surface of the earth, but in a microgravity/vacuum environment the pressure alone provides the structural strength. These composite materials do not appear appropriate for microgravity, vacuum and impact uses. The composite layers suggested contain metal flakes, which may result in significant weight.

U.S. Pat. No. 4,024,679, assigned to Irvin Industries, Inc., to Rain, et. al., and Mclorg, et. al., entitled "AIR SUPPORTED STRUCTURE MEMBRANE CONFIGURATION" is surface based air supported volumes with multiple layers and structural beams rigidized by air on the surface of the earth. In orbit in a microgravity environment of space, the inflation pressure alone is sufficient for strength. These composite materials do not appear appropriate for microgravity, vacuum and impact uses, however the material does have limited radiation protection.

U.S. Pat. No. 5,464,172, to Jensen, et. al., and Allen, et. al., entitled "DEPLOYABLE MASS AND SENSOR FOR IMPROVED MISSILE CONTROL" is an inflatable missile nose cone folded to decrease its transportation volume, but fails to address the habitation, transport packing, human aspects or the orbital particle impact hazard environment.

U.S. Pat. No. 4,562,979, to Taylor, et. al., entitled "EXPANDABLE SPACECRAFT" is a telescoping metal module innovation in an attempt to double the interior volume using a shorter module in transport and less metal. The '979 Patent to Taylor in Jan. 7, 1986 also used difficult to use seals in the extended configuration. The extra metal required to react to the launch loads encountered and provide a maximum of pressurized manned volume in orbit added significant weight. The '979 Patent is an attempt to expand the habitation volume in orbit, but uses metal and it is heavy. The metal module based on the Spacelab design in Europe is limited to fifty days on orbit and has limited impact protection. The removal of the module from the space shuttle is complicated in orbit and the Spacelab Module requires the Environmental Control Life Support Systems (ECLSS) from the orbiter.

U.S. Pat. No. 4.867,395, to Taylor, et. al., and Citron, entitled "FLAT END CAP MODULE FOR SPACE TRANSPORTATION SYSTEMS" is a flat end cap on each end of a truncated cylinder module. SPACEHAB is a pressurized module in the space shuttle payload bay based on this patent that has reduced the cost of manned tended research in the space by a factor of ten. The device reduces the transportation costs by being shorter, by using disc end caps and the truncation permits safety waivers in the space shuttle. The manned module is not manned during ascent, but does take advantage of approximately 5 feet of module less length, which reduces the space shuttle price by about $5/60$th times the launch cost. The module is truncated to allow a suited EVA astronaut access to the payload bay door latches in orbit. The system replaced a nearly identical European supplied module system ($920 million) called "Spacelab" with a commercial start-up venture with $105 million in private funds, an innovative hardware solution and the same structure subcontractor. Spacelab was built by a consortium of countries in Europe based on design from an American aerospace contractor. Using less labor and the same contractors that learned on the European Spacelab system reduced costs. The innovation of flat end cap module severely complicated the design and increased the metal structure into the range of 10,000 pounds, but the length of the module was the launch cost criteria and not the weight. Most of the reduction in cost was from the differences in the work force required in government versus commercial operation. The metal module design is limited to fifty days on orbit and has limited impact protection. The removal of the module from the space shuttle is complicated in orbit, because the SPACEHAB requires the Environmental Control Life Support Systems (ECLSS) from the orbiter.

U.S. Pat. No. 5,813,632, to Taylor, et. al., entitled "SALVAGE HARDWARE APPARATUS AND METHOD FOR ORBITING OBJECTS," is salvaging hardware transported to orbit for other reasons and potentially available. The '632 Patent could create a metal pre-tested pressure volume capable of habitation. For example, the volume of the salvaged liquid hydrogen tank is 55,000 cubic feet worth approximately $11 billion by today's habitation module costs of $201,000/CF. If two orders of magnitude of cost reduction were desired, then the developers would have $110 million to develop the interior of the salvaged hydrogen tank in orbit to achieve the goal of two orders of magnitude reduction in cost ($2,010/CF×55,000CF= $110m).

The '632 Patent uses a systems package to accomplish the salvage of the discarded tank hardware in orbit and proceed to use the pressurized tank volume for new uses including a habitation configuration. No extra metal is required and no transportation costs are incurred, except for the salvage systems package, the material and labor used to develop the interior of the ET in orbit. The transportation loads encountered by the tank are not changed on ascent and later the tank is reused to provide a maximum of pressurized manned volume in orbit (pre-tested to +40 psia) with added interior and Environmental Control Life Support Systems (ECLSS) placed inside the tank in orbit. The '632 Patent is an attempt to develop, the habitation volume in orbit from existing materials, but the ET is metal and its heavy.

The device requires significant cooperation from the governments launching large vehicles. The original tank design is limited to eight minutes of ascent use and lacks the impact particle barrier beyond the existing aluminum pressure envelope, which provides some limited impact protection. The removal of the inserts and the ECLS Systems from the space shuttle and placement into the interior of the tank is outside labor intensive and complicated in orbit plus the operation uses the orbiter and on-orbit EVA labor, all of which are expensive. This patent does salvage an ET in orbit with a mass that would cost $611 million to transport to orbit any other way.

There are few inflatable habitation modules in the prior art. U.S. Pat. No. 5,350,138 to Cubbertson, Rogers, and Ware, entitled "LOW COST SHUTTLE-DERIVED SPACE STATION," discloses a combination of an external tank and the space shuttle using pre-positioned inflatable inserts instead of inserts placed in orbit as suggested in the present invention. Altering the external tank before launch in any way requires a re-certification, which is very expensive.

U.S. Pat. No. 5,305,970, to Porter, Johns and Caudle entitled "CENTRIFUGAL SPACE PROPELLANT STORAGE AND TRANSFER DEPOT" uses a torus shape to transfer propellants, but is not manned. The massive structure suggested borders on the upper end of the expense envelope.

Inflatable structures for unmanned applications such as re-entry decoys and light solar array structures have been used in space to achieve lighter weight payloads, but inflatable manned modules have not been tested in orbit.

A TransHab Concept is a NASA initiative in 1998–99 and is a relatively simple design for an manned pressurized volume capable of being transported in the space shuttle and inflated in orbit. The concept used a weaved strap design restraining a spherical pressure envelope into a cylinder and a series of composite layers used to break down high speed particles in space. The design can be seen at website: http://technology.jsc.nasa.gov/habconference/ and is shown as a dotted structure in the drawings in the present invention.

The present invention is directed to a new inflatable habitation volume in space using an apparatus that does not use the NASA design or design direction. The present invention creates an inflatable volume in space with flat end caps, fabricates with large composite winding machines, uses commercial techniques and provisions for commercial advertising, transports in a smaller reusable launch vehicle (RLV), but could be scaled up to fit in the space shuttle. The GLOBAL OUTPOST, Inc. TransHab Concept was drafted by the inventor and was submitted to the NASA Johnson Space Center. The six month discussion and proposal period started in mid August 1999 and progressed through November 1999 with 2 concept papers of under five pages each and two entrepreneurial business proposals over 150 pages each by the company to NASA for 20 years of ISS habitation volume work to satisfy NASA requirements for costs between $150 to $204 million with $204 million as the NASA stated budget. The concept evolved and focused on a desired NASA Module. GLOBAL OUTPOST enhanced the NASA TransHab module into a business proposal with the addition of other commercial modifications to the NASA TransHab Module including, but not limited to different fabrication techniques, a focus on NASA requirements for manned habitation facilities, but also an unmanned business proposal design offering commercial services at ISS in an entrepreneurial manner. The NASA Proposal process for the $204 million TransHab entrepreneurial exploration of the inflatable alternative was terminated with NASA awarding Boeing approximately $400 million to complete the aluminum habitation module in progress.

A second part of the present invention includes the inventor's enhancements to the NASA TransHab Concept. The NASA device was fabricated in a prototype design and tested in a large vacuum chamber but used a simple design not generally used in the composite industry.

In contrast to the above described references, the present invention launches in the deflated condition, inflates in orbit, provides a pressurized volume for humans, protects the habitation environment and expands into other uses in a cost effective manner.

SUMMARY OF THE INVENTION
(DISCLOSURE OF THE INVENTION)

This present invention is a new inflatable module design using the flat end cap and an inflatable device. The present invention also modifies, expands and improves on an original NASA TransHab inflatable module design. The NASA TransHab Module is shown dotted in the drawings.

The present invention eliminates the requirement for the finished structure to withstand the launch loads, generally three times normal loads, and significantly higher and different than the module loads the structure will experience in orbit. The present invention also is a lighter weight solution for the same amount of enclosed volume when compared to a traditional metal habitation module. Lighter weight impacts the cost by reducing the mass transported to orbit. With maturity this inflatable solution combined with the reusable launch vehicle can provide the two orders of magnitude in cost reduction required for space tourist activities to emerge.

The inflatable volume apparatus comprises an inflatable volume transportable to space in the compressed form, a connector providing connection between the inflatable volume and other devices, and an expandable interior structure comprising tension cables.

The apparatus of inflatable volume comprises at least one layer and the layers including an architectural surface layer with one or more functions. These surface functions include color, wearable and washable surface, acoustical treatment, minor attachment points for light, pictures and other removable items leaving the surface capable of quick access by inhabitants for repair. The repair uses a gel layer with part A of a multi-part chemical compound, which produces structural foam when mixed with part B. The combined mixture is transported to a puncture location in the pressure envelope by the escaping interior gases. An instrumented mesh containing the ability to detect and pinpoint a break in closely spaced wire, fiber or conducting ceramic mesh and part B of a multi-part chemical compound, which produces a structural foam when mixed with part A and transported to a puncture by escaping interior gases.

The apparatus also contains a pressure bladder layer containing the internal pressure boundary layer in a non rip flexible envelope material capable of compressed transport, inflation in space and repair in a vacuum microgravity environment. This containment barrier of foldable composite materials is used to contain the spherical pressure bladder in a more useful semi-spherical shape. A series of bullet proof like material barriers are used to break up high-speed particles traveling with high energy. These separate high speed particle break-up barriers are separated by compressed foam powder activated in the inflation process and maintained at a proper space or distance between barriers with restraint loops after inflation. The spacing of the barriers is critical to breaking up the high-speed particles and dissipating their energy over a wider area of the structure, so a puncture does not occur. An exterior layer capable of foldable transport is on the outside and consistent with the temperature, solar radiation and other conditions of the space environment.

The apparatus has a material, which requires only being transported in a contained manner rather than a rigid and heavier design to resist 3 gravity launch loads. The deflated, non rigid material is like a membrane material capable of an inflated volume greater than the compressed volume, which forms a minimum material shape and is a spherical shape or a semi-spherical shape. The sphere is the maximum volume shape confined by minimum material.

The pressure envelope comprises a restraint band around a middle section with a compressed form of folds in the non-inflated structural foam. In the transported volume the structural foam is activated upon inflation.

The apparatus has a connector on each end called a flat end cap, which is disc shape structural device at each end connectable to the inflatable structure between the flat end caps. The volume contains a pressurized volume for humans or other functions. The flat end caps at each end are connectable to at least one device selected from the group consisting of another inflatable structure, a space station, an unpressurized structure, a salvaged device or hardware item, a fluid providing device, an energy-providing device, a celestial body other than earth, and space vehicle.

This connector end cap includes utility connectors and interfaces, a human hatch, a set of bolts/seals each of which joins a respective bolts/seals on a similar end cap unit and a means for attaching the inflatable volumes with bolts/seals from the inside. The inflated volume has tension cables connecting the two ends of the inflatable volume. The inside of inflatable volume has interior foldable architectural partitions attached to the tension cables to utilize the interior for human habitation, storage, scientific laboratory or other purposes.

The apparatus has an outer layer, which comprises a circular series of solar array plug into attach points and a series of solar array panels sized for the transport and capable of plugging a second solar array into a hole of the failed array leaving the old array in place. A portion of the remaining surface area used for revenue producing advertising enhancing the commercial utilization of the combination, and the combination is used in a space vacuum and microgravity.

The volume has end cap at each end of the inflatable volume having a bladder layer pressure tight bonding method and only the pressure boundary needs to be attached securely to the flat end cap. A hatch in the flat end cap capable of withstanding 14.7 psia on one side and vacuum on the other. A track around the exterior of the flat end cap for a traveling or repositionable robotic arm, and a set of robot data control tracks capable of transmitting control signals back and forth to manipulate the arm from the inside using a window and cameras for visual. The flat end cap also contains a set of utility connections through the non-hatch area from one volume to another, and an adapter capable of interfacing with ISS and Russian hatch hardware.

The inflatable volume is combined with similar units and used in a torus ring combination that has a series of modified volumes rotated to provide some portion of normal gravity for the inhabitants. The combination of similar units and salvaged space hardware forms a torus unit rotating and an axis formed with salvaged hardware such as external tanks of the space shuttle. The end of the axis is fitted with one or more exterior robotic arms capable of transferring the logistics cargo to and from the storage racks on the exterior to improve utilization of the combination, where the combination will be used in a space vacuum and microgravity.

The inflatable volume is sized for transport and insert into another in space and, used to salvage the external tank of the space shuttle, to salvage another suitable item, and to make a cave or other natural volume on another celestial suitable for habitation in a space vacuum.

A modified NASA TransHab habitation module volume is improved by adding a larger inflatable volume version transported to space in the compressed form in the aft cargo carrier (ACC), and an inflatable volume version pre-attached to the aft end of the external tank of the space shuttle. One or more compressed interior development packages are inserted into the salvaged external tank and inflated inside the existing salvaged external tank and enhance the utilization of the interior volume combination, where the combination will be used to develop volumes in a space vacuum and microgravity.

The volume of the NASA TransHab habitation module or other volume is also improved by adding a large space structures exterior frame in an erectable form for the attachment of robotically plugged in payloads.

The volume of the NASA TransHab habitation module or other volume is also improved by adding an unpressurized tunnel at both ends for connection between the inflatable volume and other items, and one or more exterior robotic arms capable of transferring the logistics cargo to and from the storage racks on the exterior to improve utilization of the combination, where the combination will be used in a space vacuum and microgravity.

The volumes are combined with other similar units and improved into torus units comprising a connector module in the compressed form in the aft cargo carrier (ACC), and a series of external tanks of the space shuttle are used as a mass heavy central axis, and a series of torus units are rotated to provide some percent of normal earth gravity, and specific space facility combinations are rotated in opposite directions to improve the stability of the rotating facility, and one or more compressed interior development packages for insertion into the salvaged external tank and inflated inside to enhance the utilization of the interior volume combination, and observation modules are used to provide space tourist activities on orbit, and where the combination will be used in a space vacuum and microgravity to develop an external tank in orbit.

Accordingly, several objects and advantages are the cost effective, reliable and safe space habitation using an inflatable integrated volume containing a series of inflatable layers protected by debris breakup barriers with spacing and exterior covering the volume for a successful habitation volume in space.

A primary object of the present invention is cost effective habitation volumes in space.

A primary advantage of the present invention is the elimination of most of the launch loads as a design consideration for an orbital pressure volume. This is accomplished using the transport of the compressed volume, inflation of the module volume in orbit, creation of a safe pressurized volume for humans and animals, protection of the habitation volume and expansion of the capability into other uses in a cost-effective manner.

Another object is to reduce the cost of habitation.

Another advantage of the present invention is the series layers used to create an interior, repair, pressure, containment and exterior layers with a semi-spherical shape contained by the disc shaped flat end cap that transfers the inflatable spherical structural loads into the flat end cap and provides a standard hatch in each flat end cap.

Another advantage of the present invention is the disc end cap with bolts capable of being installed and removed from the inside and from either end without damaging the interior environment flexibility of a washable wearable, architectural inside surface for human interaction permitting interior ISS rack mounted experiments and habitation.

Another advantage of the present invention is the pressure layer plus a repair layer with component A of a two part gel and a mesh layer with the part B of a two part foam generation reaction to move toward a puncture using the interior pressure to form a foam plug in the pressure bladder.

Another advantage of the present invention is open human access to repair the inside wall in the event of puncture.

Another advantage is the exterior solar cells used to generate electrical power.

Another advantage is the robotic arms capable of transfer of other mass including logistics items to and from the volume.

Another advantage of the present invention is the large-scale composite wound belt with electric solar cells on the exterior of the habitation volume.

Another advantage of the present invention is an integrated module wall system of separate layers for radiation, temperature, pressure, utilities and architectural systems providing an acceptable human environment within the pressure envelope.

Another advantage of the present invention is the exterior strut system compatible with the existing large space structures, providing utility systems support, and commercial opportunities for robotically receiving, transferring, attaching, detaching modules using a framework and rotational device on the end of the module.

Another advantage of the present invention is the attachment of inflatable structures to salvaged hardware and providing an acceptable method of developing pressurized volumes using inflatable volumes to create the interior pressure human environment within the salvaged hardware pressure envelope.

Another advantage of the present invention is the combination of stand alone inflatable structures with less strong interior inflatable structures that create habitation volumes inside existing salvaged hardware in orbit providing an acceptable method of developing pressurized volumes using several different types of inflatable structures.

Another advantage of the present invention is the creation of a large diameter cargo pod called the Aft Cargo Compartment (ACC) for attachment to a transportation vehicle tank. Part of the ACC remains with the tank aft section and part of the ACC is discarded after the ascent heating portion of the launch is over.

Another advantage of the present invention is the use of a large diameter cargo pod called the Aft Cargo Compartment (ACC) to transport a large diameter inflatable single module to orbit for use in space using a payload volume equal to the space shuttle.

Another advantage of the present invention is the use of a large diameter cargo pod called the Aft Cargo Compartment (ACC) to transport a large diameter inflatable single module already attached to the aft dome of an external tank of the space shuttle for use in space.

Another advantage of the present invention is the use of a large diameter cargo pod called the Aft Cargo Compartment (ACC) to transport smaller diameter inflatable, multiple modules to orbit.

Another advantage of the present invention is the compressed objects travel to orbit in a compressed state and are inserted into other volumes in orbit including the external tank of the space shuttle and other salvaged items for use in space.

Another advantage of the present invention is the objects are inflated and used to enhance the existing salvaged interior volumes already in orbit for many functions other than the original design function.

Another advantage of the present invention is the attachment of two or more inflatable volumes together at the flat end cap ends using bolts and connecting utility lines together.

Another advantage of the present invention is the use of two or more inflatable modules either in a straight line or a curved fashion with a flat end cap cable for support.

Another advantage of the present invention is the use of two or more connector modules to support a salvaged liquid hydrogen tank developed with interior inflatable units.

Another advantage of the present invention is the use of two or more connector modules to support one or more inflatable volumes developed in a curved manner and assembled into a section of a torus.

Another advantage of the present invention is the use of two or more assembled sections of a torus to complete the torus into a ring with bracing and human access spokes.

Another advantage of the present invention is two or more assembled sections of a torus rotated to produce some portion of one gravity to provide an enhanced human environment in space and lessen the effects of microgravity.

Another advantage of the present invention is two or more assembled torus units rotated in one direction to produce some portion of one gravity, while other portions of the complex are rotated in a different direction or allowed to remain at rest in order to fully utilize the gravity gradient aspects of the long axis structure and to counteract any other forces like coriolis effects and other forces that tend to unbalance the facility.

Another advantage of the present invention is two or more large diameter module and earth observation units are de-spun so as to permit space tourists to view earth and other objects from space.

Further objects and advantages of the invention will become apparent from the consideration of the drawings and ensuing description.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention relates to the inflatable structure technology, space habitation volumes, cost reduction, and expanding inflatable structure applications into space development applications.

Figure 1:
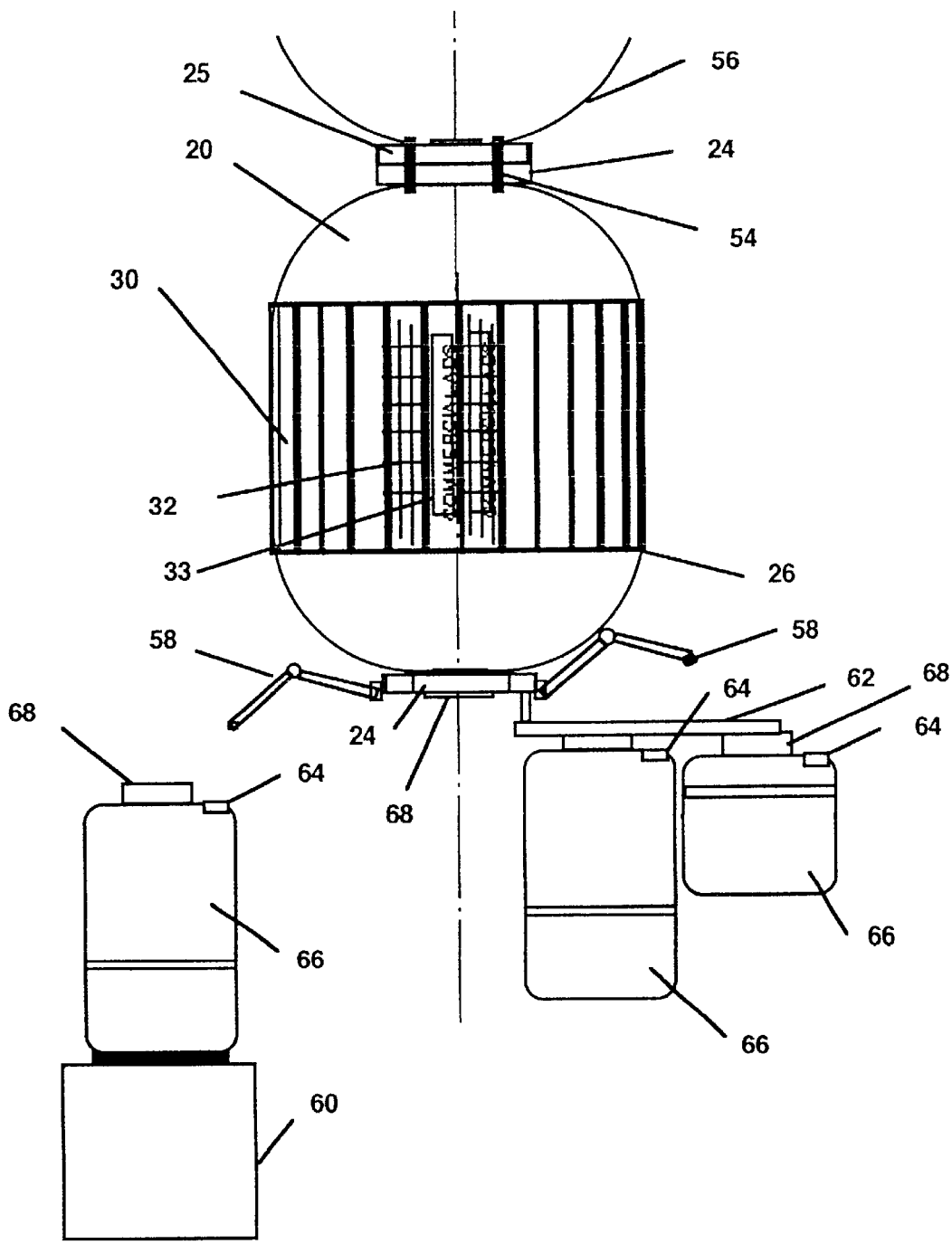
FIG. 1 is a side view of the new inflated volume.

FIG. 1 in accordance with the teachings of the present invention depicts side view of semi-spherical inflatable volume expanded 20 in orbit attached to International Space Station (ISS) or other space facility 56 and robotically handles logistics transfers and deliveries with cargo transfer robotic arm 58. Flat end cap 24 provides the upper connection to International Space Station (ISS) or other space facilities 56 using connection bolts inserted from inside 54 and/or flat end cap adapter 25. The inflatable volume expanded 20 is delivered to orbit in a de-flated state in FIG. 2, called inflatable volume in the transportation mode 22. Solar cell panels 30 with solar cells 32 provide de-centralized power to each volume are attached to the banded strength layer 26, which is used to hold the shape of the inflatable to a more acceptable elongated module shaped. On banded strength layer 26 is a series of individual solar cell panels 30 with solar cells 32 to provide de-centralized power to the individual inflatable volumes and to provide the individual removal and replacement of the solar cell panels 30 using cargo transfer robotic arm 58. Each solar panel 30 can be replaced by a similar unit providing the function of a radiator. Each solar panel 30 has commercial advertising integrated into the solar cell panel and each panel can be changed or reversed as desired by the cargo transfer robotic arm 58. Cargo transfer robotic arm 58 accepts cargo modules 66 with size that varies by using cargo docking interface 68 and grapple with target 64 to join inflatable volume expanded 20 with cargo modules 66. Cargo transfer robotic arm 58 accepts signals from inside the module and transmits the control signals to the Cargo transfer robotic arm 58 through the track on the circumference of the flat end cap 24. In order to accept and provide some surge capability in storage, cargo pallet and module storage fixture 62 is used to store empties and full modules transported by cargo delivery vehicle 60.

Figure 7:
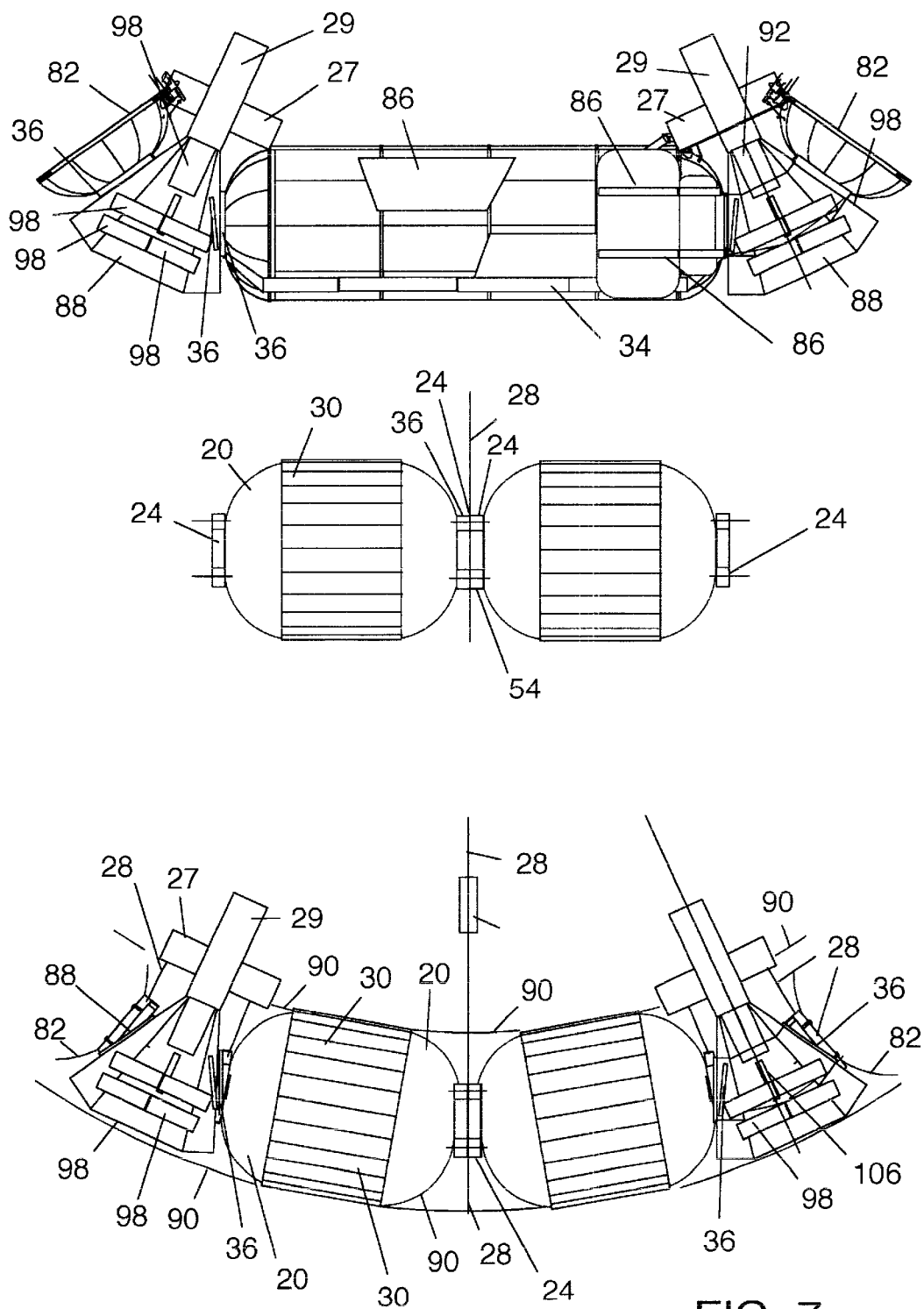
FIG. 7 is a side view of various uses of the present invention of FIG. 1 in external tank development, the aft cargo compartment (ACC) inflatable modules in a line and in a curved fashion.
Figure 8:
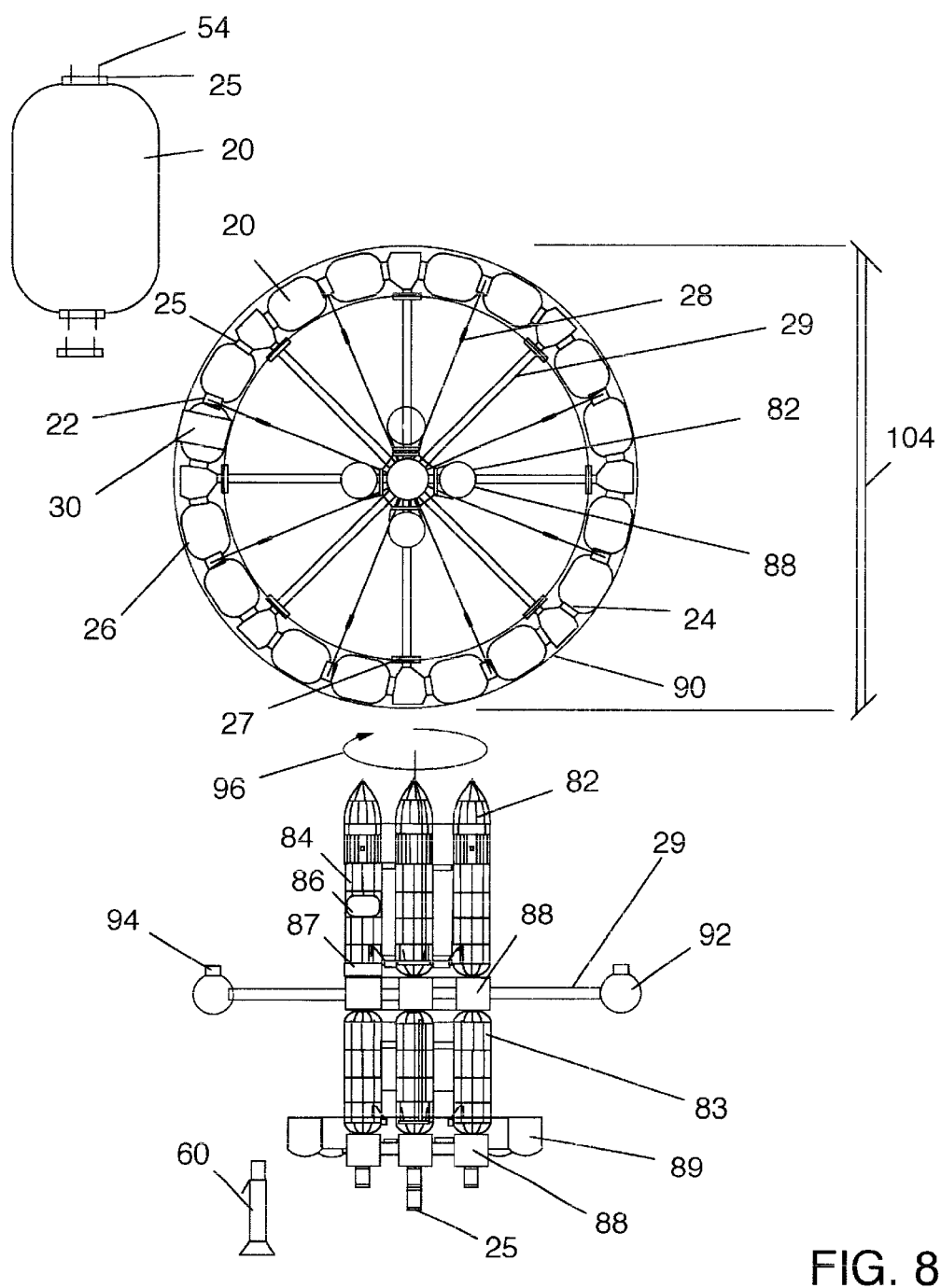
FIG. 8 is a side view of various uses of FIG. 1 in external tank development, inflatable modules in a line and in a curved fashion.
Figure 9:
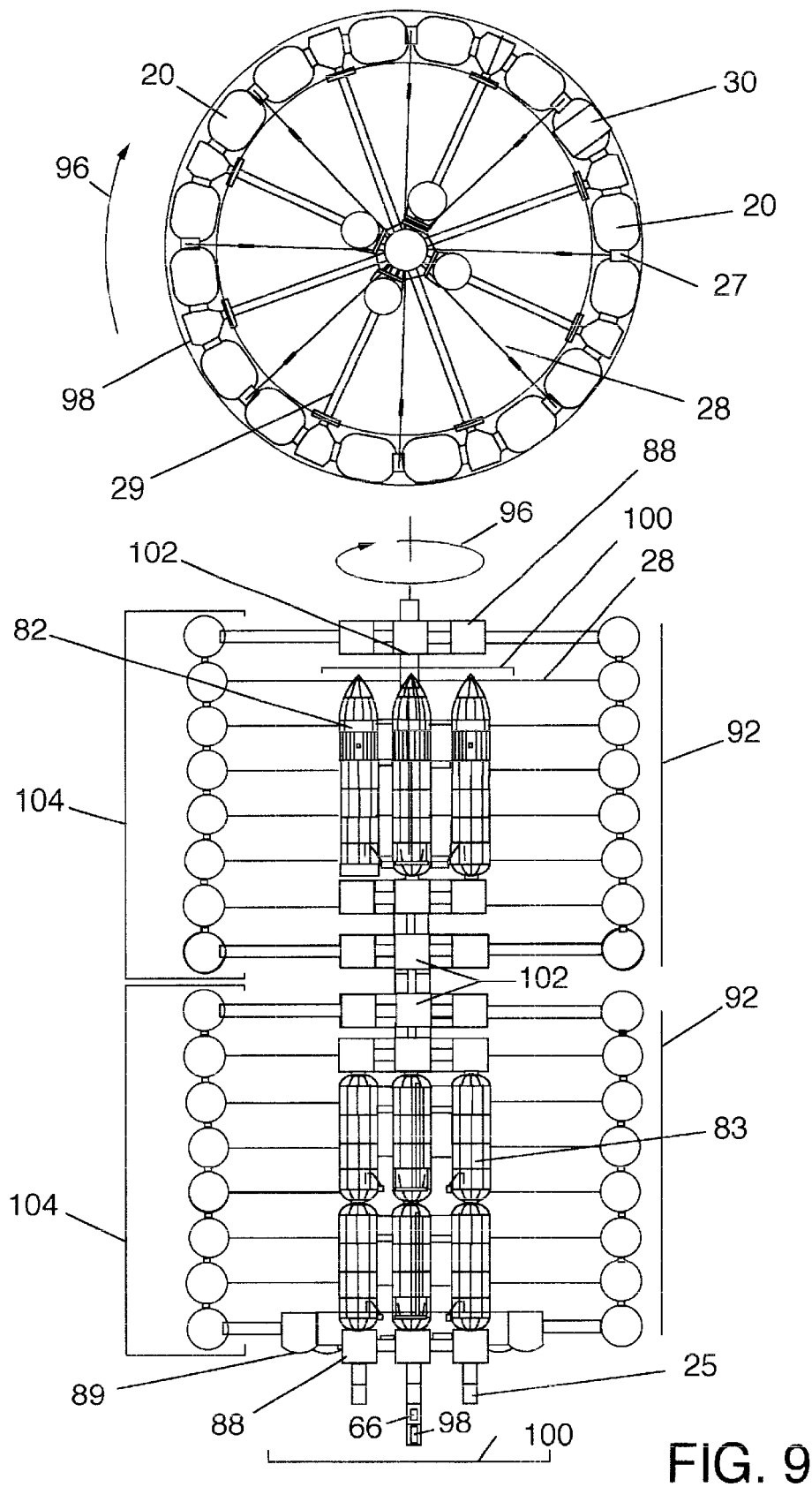
FIG. 9 illustrates in accordance with the teachings of the present invention of FIG. 1, a side view and top view of the inflatable habitation volume used to create a space tourist hotel in space about 16% of normal gravity and counter rotating segments.

Cargo delivery vehicle 60 also transports connection hardware 27 to the location and uses grapple with target 64 to grasp cargo module 66 and join the space inflatable volume expanded 20 at flat end cap 24 to new inflatable volume in transportation mode 22, international space station (ISS) or other space facility 56 inside connection bolts 54 can be installed from the inside. The connection hardware for inflatable volume in transportation mode 22 is installed to become new inflatable volume expanded 20 and become permanent inflatable volume expanded 20 of the space facility one version of which is shown in FIG. 7, FIG. 8 and FIG. 9.

Figure 2:
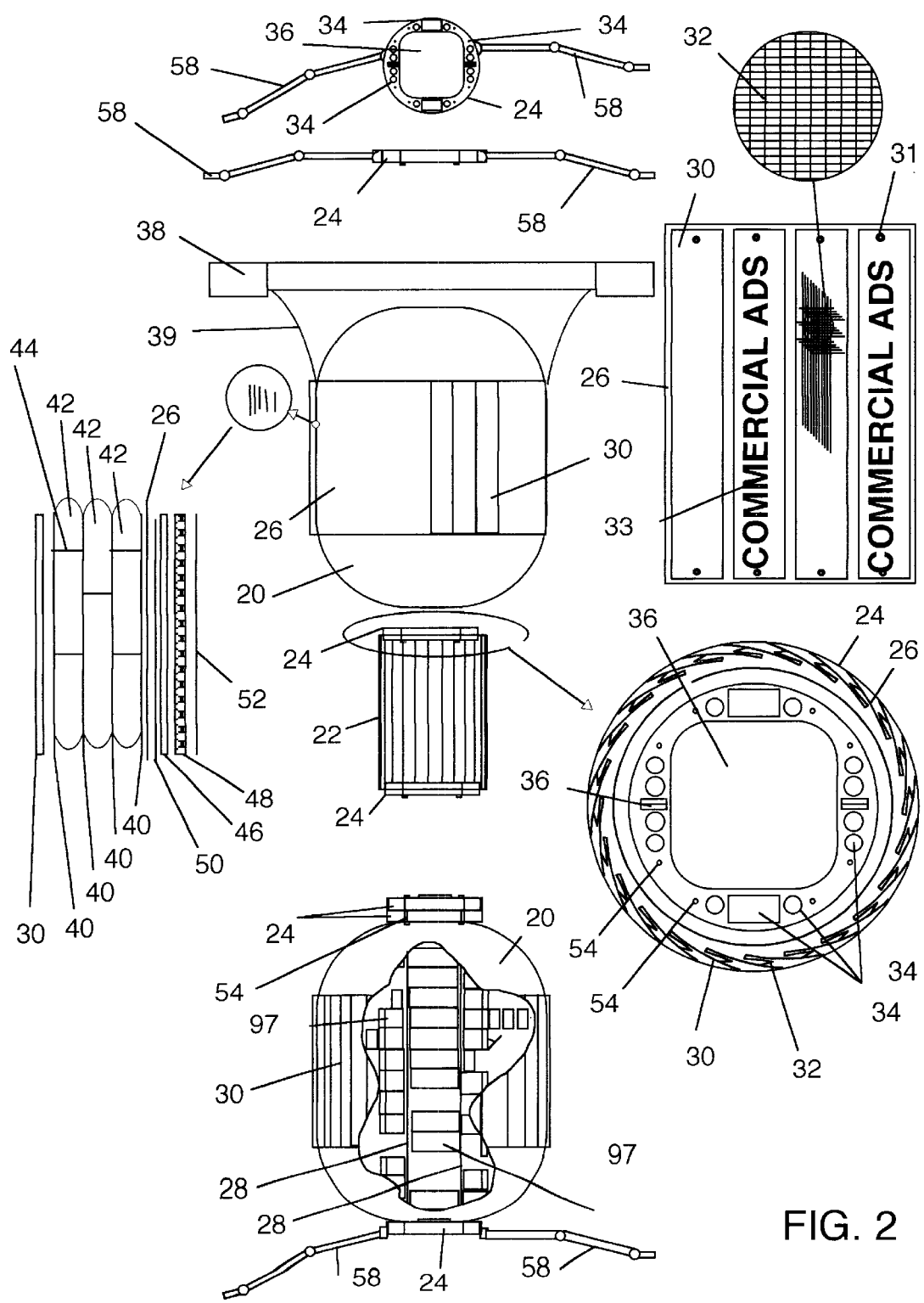
FIG. 2 is a side view and various end views of the new inflatable habitation volume of FIG. 1 and fabrication.

FIG. 2 in accordance with the teachings of the invention, depicts the design, fabrication, details of materials and packing techniques used in transport to create an inflatable habitation volume 20 using inflatable innovation and techniques in space from inflatable volume in transportation mode 22.

Inflatable habitation volume 20 is a pressurized volume shaped nearly like a sphere and containing some of the essentials for life. Some of these basic essentials, including air, oxygen, light and others, are taken for granted on earth, but in space these essentials must be provided in the hard vacuum and extreme temperature environment of space. To provide the essentials required for habitation, a structure must be provided to contain the habitation essentials at the pressure and temperature compatible with humans from earth. To provide the container in the most cost effective manner the compressed package used for transport on expensive vehicles must be of minimum weight and volume. Compressed inflatable habitation volume 22 is shaped to fit the transportation vehicle payload bay and provided with flat end caps 24 to facilitate the transportation loads into the mass of the inflatable volume in transportation mode 22 and to function as part of inflated habitation module 20 design in orbit. Being in orbit or having an orbital velocity is defined as an object traveling around a celestial body at a speed providing a centrifugal force outward that balances the gravitation force pulling the object toward the body.

Space is defined as everything beyond the atmosphere of earth and generally considered to be approximately 100 kms above the earth's surface.

The perfect sphere is an imperfect habitation volume in space for people familiar with and eager to use a module. For this reason banded strength layer 26 is introduced to constrain the sphere into a longer and narrower and possibly more useful living volume. This banded strength layer 26 is made from high strength foldable composite bands and/or composite fiber 39 wrapped by large diameter winding machine 38 and form a strength layer among other layers with different functions. Attached to banded strength layer 26 is a series of almost flat solar cell panels 30 with solar cells 32 capable of converting energy from the sun into electrical power. Solar cell panels 30 are fabricated with some curvature near the inflated diameter and fit in a nested overlapping transportation condition compatible with banded strength layer 26 as shown in FIG. 1, upper right. Solar panel 30 has solar cells 32 and single connector for solar panel 31 to be grabbed using grapple with target 64 by cargo transfer robotic arm 58 to make electrical and structural connection. Solar cell panels 30 also provides single connector for solar panel 31 with the capability of using two cargo transfer robotic arms 58 to remove the solar panel 30, regrasp the back of the panel and plug the reversed Solar panel 30 into the facility using the same single connector for solar panel 31 on the facility. This provides the capability to change and/or replace the surface of facility covered with new the solar cells 32 and commercial advertising 33 from cargo delivery vehicle 60.

The flat end cap 24 performs several functions in the life of the design. First, flat end cap 24 contains utility connections 34 for liquids, gasses, power and other items to pass through flat end cap 24 without breaking air tight pressure aspects of flat end cap 24. Flat end cap 24 also contains a hatch compatible with adjoining structure 36 and capable of being opened and permitting humans and cargo to be transferred from one safety pressure envelope to another.

The wall structure of inflatable habitation volume 20 consists of an outside layer for solar radiation protection and several layers of high speed particle breakup layer of kevlar or similar 40 material and other advanced materials similar to modem bullet-proof vest material capable of breaking up high speed particles of space into smaller particles with less impact energy. Spacing is critical and these layers are held apart by light weight foam 42 activated by the inflation process and restrained from too much expansion by loops to insure adequate spacing 44. One or more properly spaced bullet proof break up particle layers each cause the particle to fragment and strike the next layer over a wider area and with less individual particle energy. The particles lose sufficient energy in the impact and breakup with several layers of kevlar material 40 that they do not penetrate pressure bladder 50. Kevlar material 40 layers must be spaced properly to maximize the break up and dispersing of high speed particles and to spread themselves over a larger area of succeeding Kevlar layers 40 to dissipate their energy into these layers rather than focusing their energy on one small area and damaging the interior contents. Some larger particles may penetrate pressure bladder 50, so a further safeguard is provided in self-sealing gel layer 48, which if penetrated, will disperse gel into mesh layer 46. Mesh layer 46 contains part one of two part chemical foam capable of plugging small holes and using the out rushing air to mix the two part agent in areas where it is actually required to plug the leak and retain the remaining air. Mesh layer 46 is also semi-conducting and can detect the breaking of one or more of the fibers or wires of the mesh plus giving an alarm and location of the particle penetration. Given the volume of habitation facilities this translates roughly into designing the two-part gel to handle penetrations in the ¼ inch diameter range. Larger particle impacts are handled leaving the inside of the exterior walls using hand placed plugs enhancing the gel in penetration exceeding the gel capability to plug holes and using human repositioned interior Band-Aids combining the gel with composite films several feet in diameter. Basically, being penetrated by a softball size high-speed particle or larger is remote and may not be survivable. Individual inflatable habitation volumes 20 may be lost but the remaining habitation facility survives, because compartmentalization and hatches with adjoining structures 36 and with the safety closing devices regulating the number of hatches open at one time.

The interior of inflatable volume expanded 20 is different in several ways from the traditional module where items are attached structurally to the walls to gain support. The inflatable volume expanded 20 walls are curved and free of obstructions, which would hamper the repair of impact holes. The present invention reverses that tradition and provides a scenic, architectural surface capable of setting the habitation tone for the entire module. Architectural layer inside for appearance and cleaning 52 provides scenic, architectural, human factors and janitorial functions. Flat end caps 24 provide the inside structural function with tension cables 28, semi-rigid and rigid structures 53 between two flat end caps 24.

The inflatable habitation volume 20 using inflatable innovation and assembly techniques in space is transported to space with cargo delivery vehicle 60 and the inflatable volume in transportation mode 22 is grappled by the grapple with target located on each end of the inflatable volume in transportation mode 22 as part of the flat end cap 24. The inflatable volume in transportation mode 22 is grabbed using grapple with target 64 on either end as part of the flat end cap 24 by cargo transfer robotic arm 58 and transferred to the final location. The location has been pre-cleared of obstructions and the other by cargo transfer robotic arm 58, which has already been change in location to one end of the new inflatable volume in transportation mode 22. The inflatable volume in transportation mode 22 is mated to the previous flat end cap 24 and inside staff pushed through connection bolts from the inside 54. The connection bolts are pushed from the pressurized side of the interface and hand twisting engages the captive nuts in the flat end cap 24 of the new inflatable volume in transportation mode 22. The inflatable volume in transportation mode 22 is then partly inflated using atmosphere from the previous inflatable volume and various inflation layers and details are performed to bring the volume up to safety standards to allow interior staff to deploy the interior structures 53 and the tension cables 28. The interior structures 97 use the tension cables for support in microgravity and are light weight deployable units using innovative concepts of any origin. All of the outfitting is done in the shirt sleeve environment of the existing facility and no inflation equipment is carried in the inflatable volume in transportation mode 22. The mass not able to be transported with the inflatable volume in transportation mode 22 is preplaced inside the previous inflatable volume or delivered later.

Figure 3:
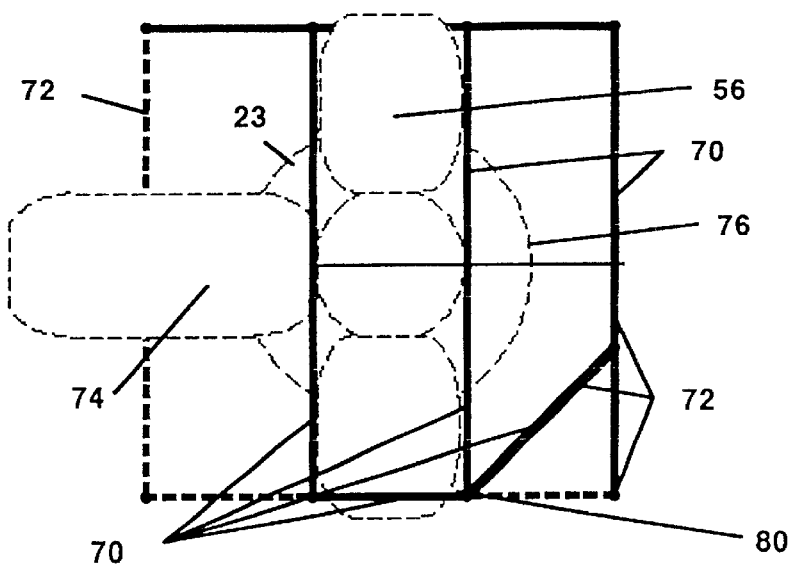
FIG. 3 is a top view of the NASA TransHab Module in dotted lines and FIG. 1 suggested by the present invention.

FIG. 3 illustrates in accordance with the teachings of the present invention, top view of NASA TransHab module 23 and metal module 74 in dotted lines are part of the existing International Space Station (ISS) 56 or other inflatable modules 56. The present invention enhances NASA TransHab module 23 including logistics deliveries, modification of the lower hatch area and design plus additional exterior struts 72 to provide an exterior commercial service for small attached experiments 78. The present invention enhances NASA TransHab module 23 has a banded strength layer unlike the banded strength layer 26 and it significantly changes and confines the NASA inflatable to a cylindrical shape. The existing facility large space structures exterior structure 72 is part of the exterior structure surrounding the existing facility pressurized module structure made from metal 74. The invention adds to the existing facility an improved inflatable pressurized volume structure 76 from NASA and the present invention adds large space structure erectable framework compatible with ISS or existing on site 70 to existing facility large space structures exterior structure 72 to permit attachment of exterior attached payloads 78, which provide revenue.

Figure 4:
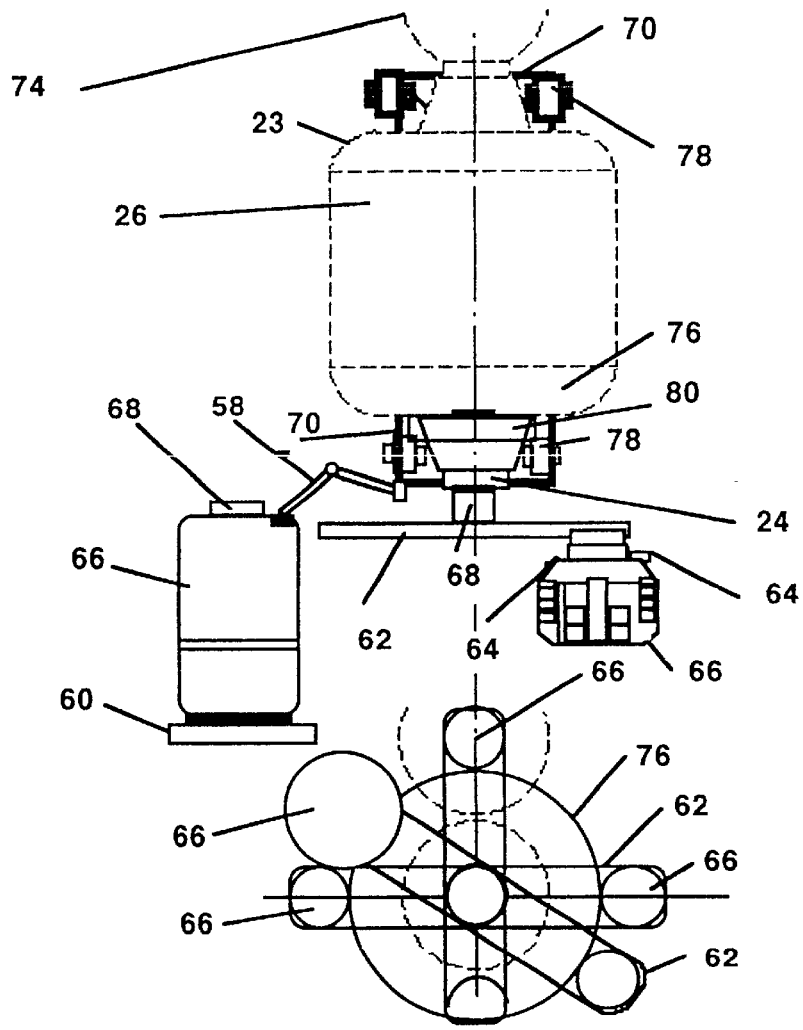
FIG. 4 is a side and bottom view of the NASA TransHab Module in dotted lines and FIG. 1 suggested by the present invention.

FIG. 4 illustrates in accordance with the teachings of the present invention, side view of NASA Habitation Module in dotted and enhancement to NASA TransHab module 23 or other inflatable structure 76 suggested by this invention including logistics deliveries, modification of lower hatch area and design plus additional exterior struts to provide an exterior commercial service for small attached experiments. Erectable large space exterior framework 70 is combined with exterior structure 72 surrounding existing facility pressurized module structure 76. The present invention adds to existing NASA TransHab large space structure erectable framework compatible with ISS or existing on site 70 to existing facility large space structures exterior structure 72 to permit attachment of exterior attached payloads 78, which provide revenue.

The NASA TransHab module 23 also has interface hardware between existing and new pressurized modules 80 and docking interface 68. Further enhancements are attached to existing NASA TransHab at one end of existing facility inflatable pressurized module structure 76 logistics handling facility with cargo pallet and module storage fixture 62 capable of storing cargo module (size varies) 66 and cargo transfer robotic arm 58. This permits the transfer of logistics items and cargo delivered by cargo delivery vehicles 60 to and from location in space. The present invention adds an interface hardware system between existing and new pressurized modules 80, which allows the introduction of logistics supplies into TransHab Module and to the rest of ISS. Cargo transfer robotic arm 58 accepts cargo modules 66 with size that varies by using cargo interface 68 and grapple with target 64 on inflatable module unit expanded 20 and cargo modules 66. Cargo pallet and module storage fixture 62 rotates and stores various items of delivery. The flat end cap 24 is used to transition from the NASA TransHab module 23 to the cargo and docking interface 68, so the cargo and docking interface 68 can be removed and new inflatable volume expanded 20 or inflatable volume in the transportation mode 22 can be connected to the NASA TransHab module 23. Exterior attached payloads 78 use exterior truss structure 72 and new large space structure exterior structure 70 points to attach and obtain access to power and other customer related services.

Figure 5:
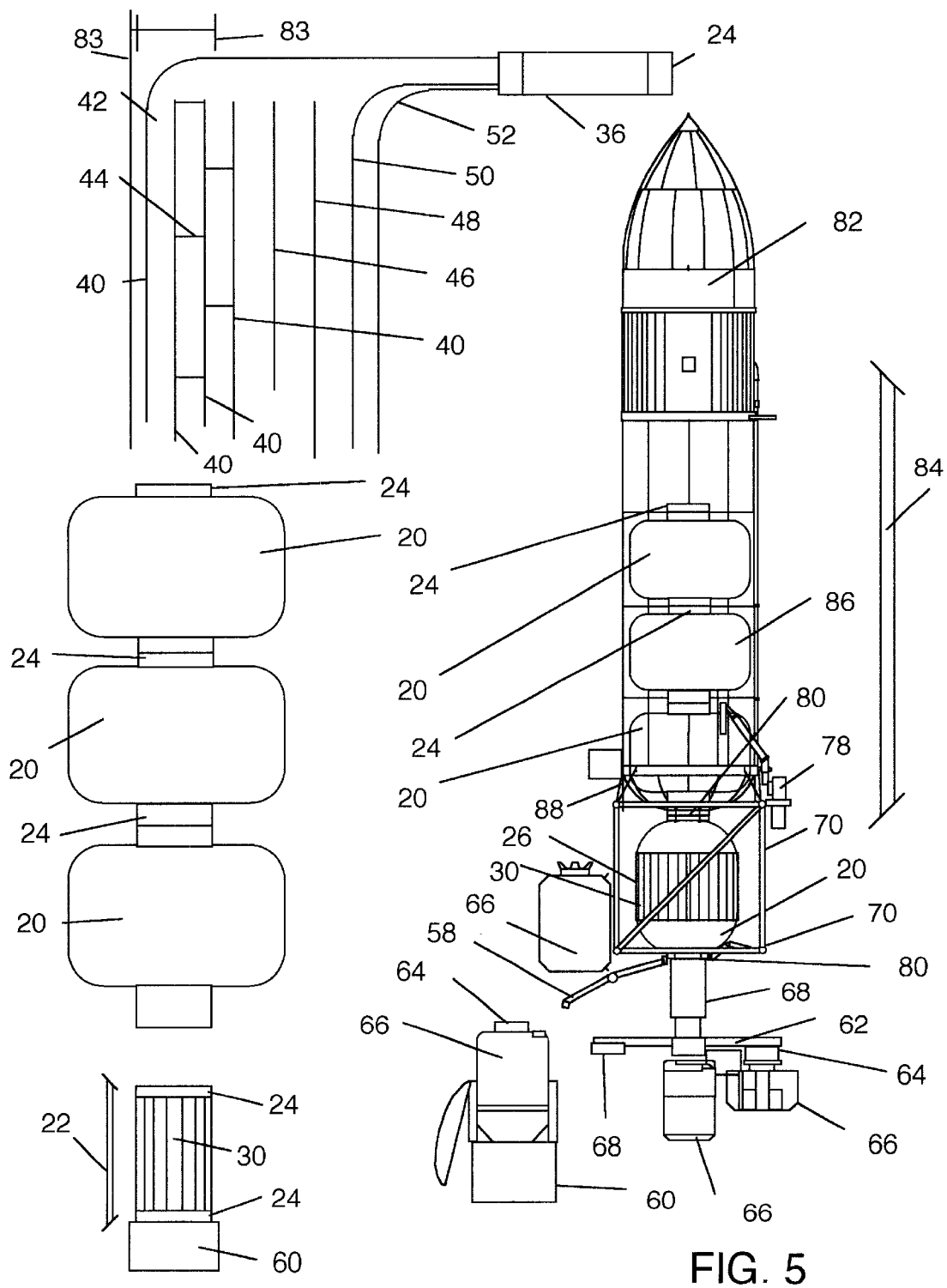
FIG. 5 is a side view of the commercial inflatable habitation volume of FIG. 1 with exterior and interior expansion and development of the inside of the salvaged external tank.

FIG. 5 illustrates in accordance with the teachings of the present invention, side view of commercial habitation module 20 with exterior and interior expansion including development within existing External Tank of space shuttle or other salvaged structure 82 or suitable existing salvaged structure with capable pressurized tank 84. Flat End Cap 24 is designed in such a manner that two Flat End Caps 24 with an inflatable unit in between form one inflatable volume expanded 20 unit and more than one similar unit can be joined to form multiple inflatable volume expanded 20 units. The inflatable volume expanded 20 units include a banded strength layer 26 and solar cells panels 30. The structure uses existing large space structure struts 70 and existing facility large space structure struts 72 to support the inflatables and the exterior attached payloads 78. This inflatable volume expanded 20 can also be joined with a dis-similar object in space such as an existing external tank of space shuttle or other salvaged structure 82 to form a new structure capable of development.

Existing liquid hydrogen tank portion external tank of space shuttle or other salvaged structure 83 is a volume used for another purpose and can be developed using inflatable volume expanded 20 techniques. When inflatable volume expanded 20 technique is used inside an existing tank with a metal tank pressure vessel, then certain changes to the wall design of inflatable volume expanded 20 must take place in design and fabrication of inflatable units placed inside a tank in orbit 86. A special interface hardware between existing and the new pressurized inflatable module 80 is required to make the transition. These design changes vary slightly with the type of function of the inside use and the type and design of the tank used, but the high speed particle break up barrier 40 is now usually aluminum and acts as outer pressure envelope 50. Normal inflatable pressure bladder 50 now acts as a secondary pressure bladder. Other components of inflatable volume 86 wall also change depending on the conditions. Remaining inflatable volume expanded 20 wall components are altered as required for assembly and safety and maintenance requirements. The interior of this volume is developed by inserting pressurized inflatable volume expanded 20 units inside the external tank of space shuttle or other salvaged structure 82 on orbit. The convenient hole diameter in the aft dome of the external tank is 10 feet in diameter and varies with other salvaged hardware. This limits the diameter of the inflatable volume expanded 86 units placed inside the external tank after it is salvaged in orbit. These inflatable pressurized units placed on orbit 86 can be placed in space by large diameter module transported by aft cargo carrier (ACC) 88 or space shuttle or cargo module (size varies) 66. These inflatable pressurized units placed on orbit 86 can contain a varying number of inflatable volume expanded 20 components including architectural layer inside for appearance and cleaning 52, hatch compatible with joining structure 36, high speed particle breakup layer kevlar or similar 40, large cell foam activated by inflation gas 42, loops to insure adequate spacing 44, mesh layer to hold and activate (part two) self-sealing foam 46, and bubble wrap layer with (part one) of self sealing gel 48. See FIG. 2 for details.

The present invention adds an interface hardware system between existing external tank of the space shuttle or other salvaged structure 82 and new pressurized modules 80. This allows the introduction of logistics supplies into inflatable volume expanded 20 and to rest of existing external tank of the space shuttle or other salvaged structure 82. Flat end cap 24 is designed in such a manner that two flat end caps 24 can be joined together to form two inflatable module units 20, which can work in a straight line or in a curved fashion.

Cargo transfer robotic arm 58 accepts cargo modules 66 with size that varies by using cargo interface 68 and grapple with target 64 on inflatable module unit expanded 20 and cargo modules 66. Cargo pallet and module storage fixture 62 rotates and stores various items of delivery.

Figure 6:
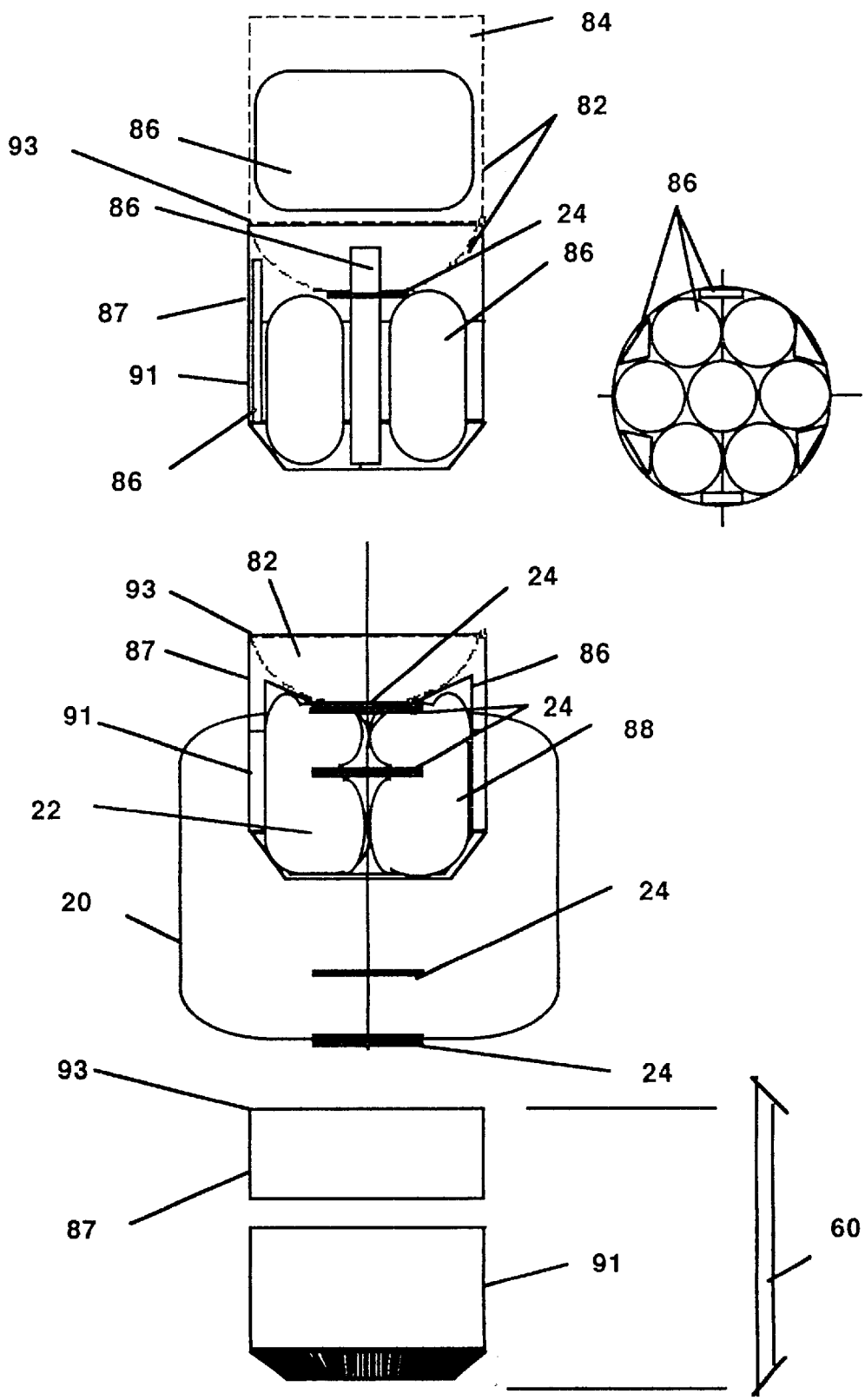
FIG. 6 is a side view and various end views of FIG. 1 in the Aft Cargo Carrier (ACC) attached to the external tank and transporting an inflatable module.

FIG. 6 illustrates in accordance with the teachings of the present invention, a side view and various end views of aft cargo carrier (ACC) in two sections, first the aft cargo carrier (ACC) Forward Section which remains attached 87 attached to the salvageable existing external tank of space shuttle or other salvaged structure 82 and second, aft cargo carrier (ACC) discarded section (detached) 91, which is jettisoned after major part of the ascent is accomplished. The aft cargo carrier (ACC) is the delivery vehicle 60 in this salvage operation. The aft cargo carrier attaches to a simple attachment bolt ring at the 2058 ring frame 93. The aft cargo carrier (ACC) 88 doubles the payload volume and does not add any additional payload weight capability to the shuttle payload weight, but offers additional volume for inflatable pressurized units placed on orbit 86. These inflatable pressurized units placed on orbit 86 should be of less density than normal payload cargo and require the additional volume. These inflatable pressurized units placed on orbit 86 can be placed inside external tank or other salvaged structure with capable pressurized tank 84 or be used as inflatable module unit expanded 20 structure as shown in the middle image in FIG. 5 and create an inflatable module of larger size than is possible inside the space shuttle payload bay. For example, ACC can provide 25' diameter volume 22' long for an inflatable module unit in transport condition 22 and expanded at the estimated ratio of 1.9 provides 47' diameter inflatable module 20. Flat end cap 24 can be pre-installed at the bottom dome of the existing liquid hydrogen tank portion external tank of the space shuttle or other salvaged structure 82 and provide a metal cutting capability to open the external tank aft dome to allow reasonably rapid development in orbit.

The logistics flow permits the interior development of 55,000 cubic feet of volume inside salvaged external tank of the space shuttle using inflatable pressurized units placed on orbit 86 by cargo delivery vehicles 60 using cargo pallet and module storage fixture 62 to grapple with target 64 cargo module (size varies) 66. The system is designed to minimize on orbit labor.

The existing salvaged structure with capable pressurized tank 84 could be any salvageable tank like structure capable of safely holding a pressure compatible with human life. Inflatable pressurized units placed on orbit 86 are inserted through one or more penetrations in the tank. Additional exterior hardware either placed in the existing tank or added on the large space structure erectable framework compatible with ISS or existing on site 70 to allow attachment of exterior attached payloads 78.

FIG. 7 illustrates in accordance with the teachings of the present invention, side view of various uses of invention inflatable volume expanded 20 in external tank development and outside external tank use including inflatable modules in a straight line in the middle of FIG. 7 and in a curved fashion in the bottom of FIG. 7.

The connection hardware 27 is used to connect heavy sections of existing salvaged liquid hydrogen portions of the external tank or other salvaged structure 83 and existing salvaged structures with capable pressurized tanks 84 to form structural cradle capable of supporting either the liquid hydrogen tank or the inflatable volumes expanded 20 between the passenger connectors 29. AT the end of each passenger connectors 29 is a large diameter module transported by the aft cargo carrier (ACC) 88 and used to create with rotation a connection between segments of the torus assemblies 92 in a ring. Inflatable expanded volumes 20 in the torus have flat end caps 24 for connections and solar cells 32 on the outside. The connection bolts connect the inflatable volumes 20,except where a thermal cover 90 is used.

The existing external tank of space shuttle or other salvaged structure 82 is developed using inflatable pressurized units placed on orbit 86 transported in aft cargo carrier (ACC) discarded section 91 (already discarded) and aft cargo carrier (ACC) forward section 87 in FIG. 5. Further ACC carries torus assemblies with multiple inflatable units connected 92, which provide connection between two existing liquid hydrogen tank portions of external tank of space shuttle 83 or other salvaged structure 84 or two inflatable module unit expanded 20 as show in middle FIG. 7. When two or more inflatable module units expanded 20 are used in combination then cable connectors 28 are not used, but when the final structure in orbit is rotated at some revolutions per minute then cable connectors 28 are added as shown in the bottom of FIG. 6.

Utility connections 34 are installed to provide utilities to the living volumes inside inflatable modules 20 or inserted inflatable modules 86. Environmental control life support (ECLS) units capable of logistics change out 98 are placed in the structure to provide breathable atmosphere at the human pressure level and these environmental control life support (ECLS) units capable of logistics change out 98 are capable of being removed and replaced with new units. Hatches compatible with joining structure 36 are used to isolate each volume for safety reasons. Passenger lift belt transporter 106 is added to provide for the movement of passengers from partial gravity volumes of the resulting facility to non-gravity volumes.

FIG. 8 illustrates in accordance with the teachings of the present invention, side view and top view of the inflatable habitation volume 20 used to develop rotating torus space station and development of the external tank with aft cargo carrier (ACC) attached as a mass for the central axis of the facility. The rotation at 2 rpm to provide approximately 16% simulated gravity 96. Torus cylinder allowed to rotate 104 to provide varying approximations of earth gravity. The facility is made from existing external tank or other salvaged structures 82, existing liquid hydrogen tank portions 83 and existing salvaged structure with capable pressurized tanks 84, inflatable pressurized units placed in orbit and aft cargo carrier (ACC) forward sections remains attached 87 to complete a torus assembly with multiple inflatable units connected 92. The inflatable volumes in the transportation mode come from cargo delivery vehicles 60 or from the large diameter modules transported in the large diameter module transported by the aft cargo carrier (ACC) 89. These 22 have banded strength layers and solar cells 32. The facility rotates and forces the inhabitants outward to simulate approximately 16% of normal gravity.

Cylinder torus space station 104 is allowed to rotate and made up from inflatable volumes expanded 20 and uses flat end cap 24, banded strength layers and created in orbit from inflatable volumes in the transportation mode 22 to create series flat end cap volumes connected at flat end caps with flat end cap adapter 25, banded strength layers 26 and connection bolts 54. Also possible is a large diameter module transported by aft cargo carrier (ACC) 88 used to make a series of volumes connected at flat end cap adapter 25 and used in a torus or ring. Connection hardware 27, cable connectors 28 and passenger connectors 29 support the torus structure ring as it rotates. Solar cell panels 30 and thermal cover 90 makes up the exterior of the torus.

Existing external tank of space shuttle or other salvaged structure 82 is dis-assembled to produce existing liquid hydrogen tank portion external tank of space shuttle or other salvaged structure 83 or any existing salvaged structure with capable pressurized tank 84 is combined with inflatable pressurized units 86 and aft cargo carrier (ACC) 87 and large diameter module transported by aft cargo carrier (ACC) 88 plus large diameter module for earth observation transported by aft cargo carrier (ACC) 89 to form a space facility. The torus assemblies with multiple inflatable units connected 92 provide passenger access to future torus assemblies 94 for expansion.

FIG. 9 illustrates in accordance with the teachings of the present invention, side view and top view of inflatable habitation volume 20 used to create a space tourist hotel in space with 16% of normal gravity with counter rotating capability some distance into the future. Inflatable volumes in the transportation mode 22 become inflatable volumes expanded 20 in orbit and are combined with tension cables, passenger connectors, solar cell panels 30, existing external tank 82, existing hydrogen tank 83 and large diameter modules transported by the aft cargo carrier (ACC) 88 with environment control life support (ECLS) units 98 and large diameter magnetic bearings 102 to form a torus, to rotate and to operate in microgravity. Torus assemblies with multiple inflatable units connected 92 are rings or torus shaped units made from a series of assemblies of the shown in FIG. 6. Torus assemblies with multiple inflatable units connected 92 are caused to rotate at 2 rpm to provide approximately 16% simulated gravity 96. Sections of torus cylinder are allowed to rotate 104 and sections in the central axis non-rotating core with gravity gradient stabilization mass below this line 100. This balances some of the forces in the microgravity environment and the mass of the central axis is subject to gravity gradient forces that help point this long axis toward the center of the earth.

A functioning space tourist hotel must offer cruise ship like attractions including the opportunity to experience both the microgravity environment in the central core and~16% gravity in the rotating volumes. The rotation at 2 rpm to provide approximately 16% simulated gravity 96 may help to minimize the tendency to get sick in microgravity for approximately three days while one's body adapts to this new environment for our species. Another space tourist attraction is the viewing of earth from the large diameter module for earth observation transported by aft cargo carrier (ACC) 89, which are non-rotating. The transfer of passengers is accomplished a series of flat end cap modules 25 of the non-inflatable configuration, but use flat end caps 24 and connection bolts inserted from inside 54 to create stings of volumes from discarded logistics modules or cargo modules 66.

Figure 10:
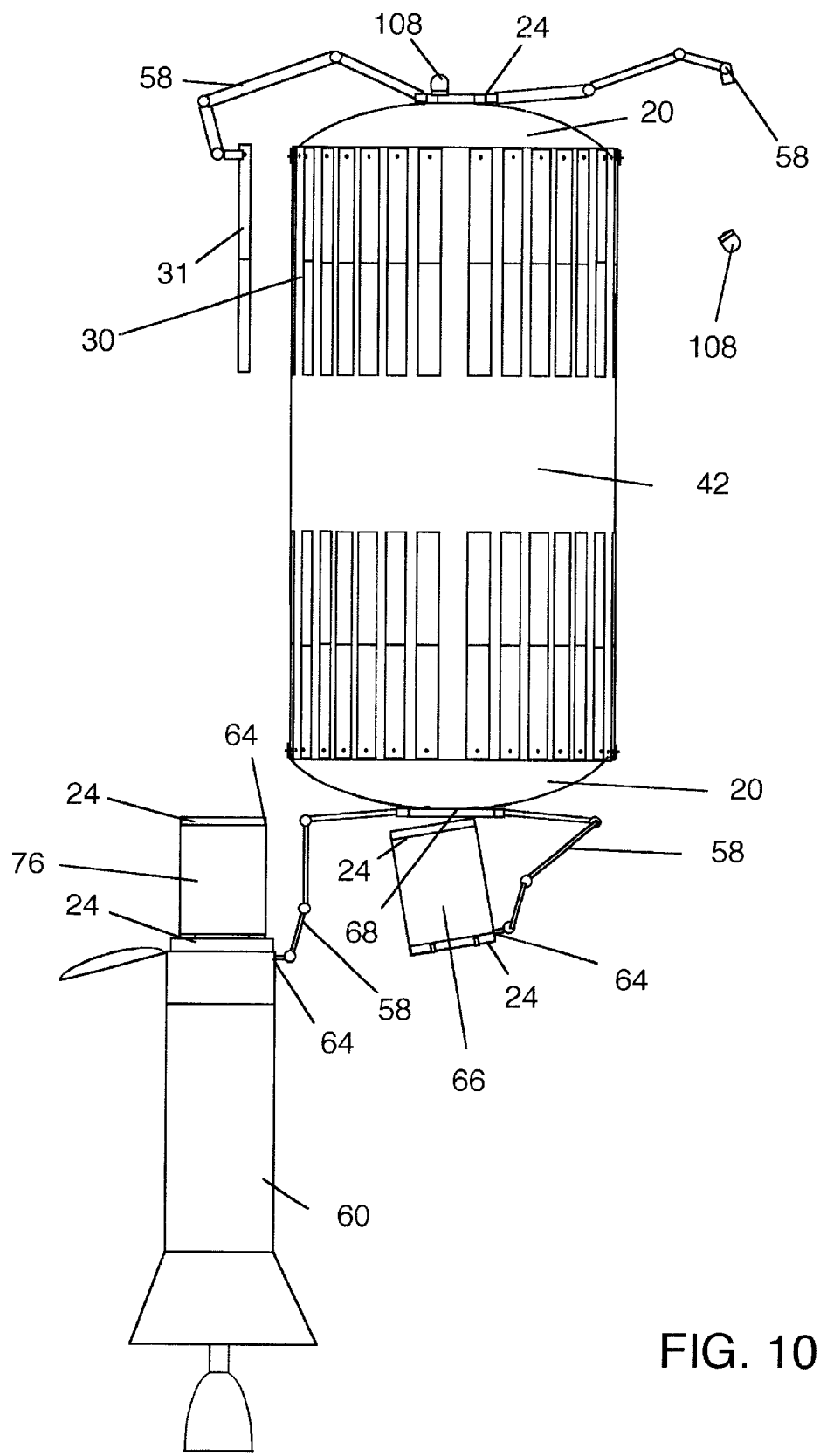
FIG. 10 illustrates in accordance with the teachings of the present invention of FIG. 1, a side view of the inflatable habitation volume used to gather technical data on the high speed particle impacts for future inflatable structures.

FIG. 10 illustrates in accordance with the teachings of the present invention, side of inflatable habitation volume 20 used to create an early test inflatable structure to gather high energy particle impact data using impact instrumentation 108 including size, distribution and energy on future large size inflatable structure 20 and other uses. Inflatable volumes used as cargo volumes of varying sizes 66 and existing facility inflatable 76. Each module has a flat end cap 24 or a flat end cap adapter 25 at each end to facilitate transfer from cargo delivery vehicles 60 to and from the docking interface 68 using cargo transfer robotic arms 58 coupled with the grapple with target 64. The inflatable volume expanded 20 in orbit is rigidified using the large cell foam activated by the inflation gas 42 and are combined with tension cables, passenger connectors, solar cell panels 30 and single connector for solar panel 31.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

INDUSTRIAL APPLICABILITY

The invention is further illustrated by the following non-limiting examples.

Mankind is moving off the planet, but must take some of the comforts of home like air, water, shelter and food, plus reliable transportation. Science fiction literature, both print and film, has examples of habitation in the new microgravity environment of space. The print media does not actually have to address microgravity as the reader envisions the story line and usually disregards the technical aspects, but movies either depict people floating or ignore it altogether and the public accepts it. Two movies standout for their depiction of microgravity, one a Disney movie called "Black Hole," a box office disaster and "2001, A Space Odyssey," a box office success.

EXAMPLE 1

Torus Habitation

The torus hotel in low earth orbit in the movie "2001, A Space Odyssey" has defined most of society's vision of a hotel in space. The large hotel rotated and provided a simulated gravity on interior curved floors. The torus structure was square and large enough in diameter to produce what appeared to be near earth gravity while staying within the anticipated 1 to 4 rpm human requirement for coriolis acceleration and sickness. The problem with a large torus is the expense and the financial risk. Hotel owners build big hotels with large budgets, but space is at the very upper end of the budget.

The cost solution for habitation in space is a phased approach with a design of the present invention using salvaged hardware to reduce the costs. The present invention explores near term hardware options somewhere between the movie image of a hotel in "2001" and an actual partial gravity hotel capable of being built reasonably quickly or within a decade.

EXAMPLE 2

Salvaged Hardware Torus Habitation

The space tourism industry requires cost effective habitation facilities. Space tourists still must address the fact that 50% of the space travelers in microgravity, including parabolic flights, still experience a debilitating Space Adaptation Syndrome. Using the present invention, partial gravity is provided and therefore there is less Space Adaptation Syndrome.

The external tank of the space shuttle is salvageable. U.S. Pat. No. 5,813,632, to Taylor, et. al., entitled "SALVAGE HARDWARE APPARATUS AND METHOD FOR ORBITING OBJECTS," salvages both U.S. and Russian space transportation hardware launched to orbit for other reasons and potentially available for torus construction. A number of torus structures are possible with some assembly in orbit. Most rotating hotel designs including some large concepts originating in Japan have components of the salvaged external tank. U.S. patent application, Serial No. 09/076,188, to Taylor, et. al., entitled "CENTRIFUGAL GRAVITY HABITATION TORUS CONSTRUCTED OF SALVAGED ORBITAL DEBRIS," detailed a torus design using the 27' diameter 100 foot long liquid hydrogen tank as the basic building component of a 300 foot diameter torus rotated at 2 rpm to produce approximately 16–20 percent of earth's gravity. This design can be built in today's aerospace environment with the salvage innovation of the '632 Patent. The '632 Patent torus design, while appealing to society with its inflatable interiors, suffers from a heavy torus ring that forces heavy and costly support hardware. The present invention, in contrast, provides for a cost effective habitation.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A inflatable volume apparatus comprising:
   an inflatable volume transportable to space in a compressed form;
   a connector providing connection between the inflatable volume and at least one other external device; and
   an expandable interior structure comprising tension cables.

2. The apparatus of claim 1 wherein said inflatable volume comprises at least one layer.

3. The apparatus of claim 2 wherein said at least one layer comprises:
   an architectural surface layer comprising at least one member selected from the group consisting of color; wearable surface; washable surface; acoustical treatment; minor attachment points for lights, pictures and other removable items.

4. The apparatus of claim 2 comprising a gel layer.

5. The apparatus of claim 4 wherein said gel layer comprises a chemical compound that produces foam for transporting to and filling punctures in said apparatus.

6. The apparatus of claim 5 further comprising a detection layer comprising instrumented detection of punctures in said apparatus, wherein upon detection of a puncture, said gel layer produces said foam, said foam is transported to the puncture and fills the puncture.

7. The apparatus of claim 1 further comprising a detection layer comprising instrumented detection of punctures in said apparatus.

8. The apparatus of claim 7 wherein said detection layer comprises at least one member selected from the group consisting of spaced wires, fibers and conducting mesh.

9. The apparatus of claim 1 further comprising a pressure bladder containing an internal pressure of said volume.

10. The apparatus of claim 9 wherein said pressure bladder comprises a flexible envelope capable of compressed transport and capable of inflation in space.

11. The apparatus of claim 10 wherein said flexible envelope is made of a material capable of preventing rips and capable of enhancing repairs in a microgravity environment.

12. The apparatus of claim 1 further comprising at least one material barrier for breaking up high-speed external particles.

13. The apparatus of claim 12 comprising multiple material barriers separated by foam generated in an inflation process of said inflatable volume.

14. The apparatus of claim 1 wherein said connector comprises an end cap.

15. The apparatus of claim 14 wherein said end cap comprises a disc shape.

16. The apparatus of claim 1 wherein said connector comprises utility connectors comprising at least one member selected from the group consisting of bolts, nuts and seals which joins a respective member on a similar end cap unit of the external device.

17. The apparatus of claim 1 further comprising means for attaching said inflatable volume to the external device with a said connector from inside.

18. The apparatus of claim 1 wherein said tension cables are disposed between two ends of said inflatable volume.

19. The apparatus of claim 1 further comprising at least one interior architectural partition attached to said tension cables to utilize an interior for at least one use selected from the group consisting of human habitation, storage, and scientific laboratory.

20. A space habitation module comprising:
   an inflatable volume transported to space in a compressed form in an aft cargo carrier; and
   an inflatable volume pre-attached to an aft end of an external tank of a space shuttle;
   whereby said inflatable volumes are confined to form the habitation module.

* * * * *